United States Patent
Yang

[11] Patent Number: 6,064,937
[45] Date of Patent: May 16, 2000

[54] COMPOUND CRUISE CONTROL SYSTEM AND METHOD FOR SOLAR CARS

[75] Inventor: Chaemo Yang, Ansan-si, Rep. of Korea

[73] Assignee: Hyundai Motor Company, Seoul, Rep. of Korea

[21] Appl. No.: 08/959,923

[22] Filed: Oct. 29, 1997

[30] Foreign Application Priority Data

Oct. 29, 1996 [KR] Rep. of Korea ...................... 96-49435

[51] Int. Cl.$^7$ .................................................. G06F 17/00
[52] U.S. Cl. .............................. 701/93; 701/22; 180/2.2; 180/65.2; 477/20; 477/15
[58] Field of Search ................... 701/93, 22, 96; 180/2.2, 181, 216, 65.3, 65.4, 220, 179, 170, 197, 65.8; 323/222, 282, 906, 234, 280; 320/102, 145; 477/20, 15, 107, 108, 3, 42, 54; 123/357, 349, 350, 361; 318/139, 258, 599

[56] References Cited

U.S. PATENT DOCUMENTS

| | | | |
|---|---|---|---|
| 3,913,419 | 10/1975 | Sale et al. | 477/54 |
| 4,141,425 | 2/1979 | Treat | 180/2.2 |
| 4,272,707 | 6/1981 | Burgener et al. | 318/139 |
| 4,771,656 | 9/1988 | Itoh et al. | 477/42 |
| 4,845,621 | 7/1989 | Kawata et al. | 701/95 |
| 4,988,061 | 1/1991 | Miller et al. | 246/182 R |
| 5,019,986 | 5/1991 | Londt et al. | 701/94 |
| 5,237,263 | 8/1993 | Gannon | 323/288 |
| 5,301,764 | 4/1994 | Gardner | 180/65.2 |
| 5,355,749 | 10/1994 | Obara et al. | 477/20 |
| 5,479,557 | 12/1995 | Ganz et al. | 388/829 |
| 5,722,911 | 3/1998 | Ibaraki et al. | 477/3 |
| 5,774,820 | 6/1998 | Linden et al. | 701/93 |
| 5,799,262 | 8/1998 | Suzuki | 701/93 |
| 5,801,519 | 9/1998 | Midya et al. | 323/222 |
| 5,894,898 | 4/1999 | Catto | 180/2.2 |

FOREIGN PATENT DOCUMENTS

19604800A1 8/1996 Germany .

OTHER PUBLICATIONS

"Improvement of Induction Motor Drive Systems Supplied by Photovoltaic Arrays with Frequency Control", by Yao Y et al., published Jun. 1, 1994, vol. 9, No. 2, pp. 256–262.
"A High–Frequency Maximum Power Point Tracker for Photovoltaic Arrays in a Solar–Powered Race Vehicle", by Sullivan C R et al., published Jun. 20, 1993, No. Conf. 24, pp. 574–580.
Japanese Patent Abstract, No. 5184018, published Jul. 23, 1993.

Primary Examiner—Jacques H. Louis-Jacques

[57] ABSTRACT

Disclosed is a compound cruise control system for solar cars including a signal output portion for detecting and generating signals regarding vehicle speed, power consumption, and cruise control selection of an operating vehicle; a control portion for controlling the general operation of the vehicle according to the generated signals and established map data; a power generating portion for generating drive electric energy; and a drive portion for processing drive energy of the power generating portion and making adjustments of vehicle operation according to signals from the control portion.

14 Claims, 3 Drawing Sheets

COMPOUND CRUISE CONTROL SYSTEM AND METHOD FOR SOLAR CARS

FIELD OF THE INVENTION

The present invention relates to a compound cruise control system and method for solar cars, and more particularly, to a compound cruise control system and method for solar cars in which consumption of electric energy and vehicle speed are simultaneously controlled at optimum levels of efficiency when cruise control is selected.

BACKGROUND OF THE INVENTION

Generally, solar cars convert light energy into electric energy through solar cells, provided at fixed locations on a vehicle, to charge batteries, the energy from which is used to drive and vehicle.

However, as the amount of electric energy converted in the solar cells and the amount of electric energy able to be discharged by the batteries is limited, a control system is needed to maximize the use of energy.

In the prior art solar car, when cruise control is selected by the driver, energy usage is optimized by utilizing either a speed cruise control method in which vehicle speed is maintained at a constant level, or an electric power cruise control method in which a predetermined amount of electric power is consumed at a constant level.

In the above speed cruise control method, a control line is achieved only on the basis of a pre-set vehicle speed. Accordingly, if there are changes in road gradient, the amount of wind or other factors that affect drive resistance, energy consumption levels are varied to maintain the vehicle at a constant speed.

So, for example, when driving in a state of 0% drive resistance (i.e., a level road surface and no wind or other factors affecting drive resistance being present) with the cruise speed set at 81 km/h such that electric energy consumption is 1200W, if one of the factors changes to increase drive resistance, a central processing unit (CPU) outputs a signal to increase torque to maintain the 81 km/h cruise speed. Accordingly, the amount of energy consumed increases such that energy efficiency decreases.

Further, in this high-torque and low-efficiency operational state, motor efficiency is worsened by an increase in temperature, and capacity, energy efficiency, and life of the batteries are reduced.

If the electric power cruise control method is used, a control is achieved only on the basis of a pre-set level of energy consumption. Accordingly, if changes occur in drive resistance, because the CPU performs control to consume a predetermined amount of electric power at a constant level, vehicle speed is not uniformly maintained such that the advantages of cruise control are negated.

This overloads the motor and reduces the life of the same as drive efficiency is negatively influenced.

SUMMARY OF THE INVENTION

The present invention has been made in an effort to solve that above problems.

It is an object of the present invention to provide a compound cruise control system and method for solar cars in which cruise control is achieved in accordance with energy consumption associated with vehicle speed, thereby maximal energy efficiency.

To achieve the above object, the present invention provides a compound cruise control system and method for solar cars including a signal output portion for detecting and generating signals regarding vehicle speed, power consumption, and cruise control selection of an operating vehicle; a control portion for controlling the general operation of the vehicle according to various detected information and established map data; a power generating portion for generating drive electric energy; and a drive portion for processing drive energy of the power generating means and making adjustments of vehicle operation according to signals from the control portion.

The signal output portion further includes a vehicle speed sensor which detects key information for setting cruise control, vehicle speed information, and energy consumption information and inputs the detected signals to the control portion, and detects present vehicle speed and outputs a corresponding electric signal; a cruise fixing sensor which detects key information input to set and release cruise control, and outputs a corresponding electric signal; and a power consumption sensor which detects the amount of power being consumed and outputs a corresponding electric signal.

The power generating portion further includes solar cells which convert light energy into electric energy, merge the electric energy from each cell and output the same; a maximal power tracker which controls a convergence degree of the solar cells such that electric energy from the same can be optimized; a DC/DC converter which converts voltage of the electric energy received from the solar cells and outputs the converted voltage; a battery which stores and outputs electric energy from the DC/DC converter; and a contactor which selects and outputs power output from the maximal power generating portion and the battery.

The drive portion further includes a controller which processes the power supplied from the power generating portion to a predetermined state according to the signals from the control portion and outputs drive power; and a motor which rotates wheels of the vehicle according to the signals output from the controller.

The control means establishes a map table after taking into account a map table with regard to motor efficiency in a memory section, a high efficiency section of the motor on a vehicle drive resistance line, drive resistance enabling driving in a cruise speed, upper and lower drive speed limits, and a power consumption limit.

A compound cruise control method for solar cars comprising the steps of setting a standard power consumption level using a present power consumption level of the motor or a standard consumption level established immediately prior to operation of cruise control, and setting a standard vehicle speed using the present vehicle speed or the standard vehicle speed established immediately prior to operation of the cruise control; setting a maximum vehicle speed and a minimum vehicle speed based on motor efficiency map data derived from the standard power consumption and the standard vehicle speed; determining present vehicle speed and comparing the same with said maximum and minimum vehicle speeds; calculating target power according to said standard power, standard vehicle speed, and present vehicle speed when the present vehicle speed is between said maximum and minimum vehicle speeds; and determining an output torque value such that target power becomes drive power consumption of the motor, and maintaining cruise control at a vehicle speed within a section of motor efficiency.

The output torque value is set at '0' if it is determined that the vehicle is in an overrun stage, caused by a reduction in drive resistance, where the present vehicle speed is above the maximum vehicle speed.

If it is detected that vehicle speed is less than the minimum vehicle speed, the output torque value is calculated and cruise control is maintained after the target power is calculated.

The target power, set according to changes in drive resistance when driving in cruise control, is calculated using the following formula:

$$\text{Target Power } (Pout) = Pint \times \left(\frac{Vt}{Vo}\right)^3$$

If the target power, calculated according to changes in drive resistance, is below the standard power consumption, vehicle speed is increased, and if the target power is above the standard power consumption, vehicle speed is reduced.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
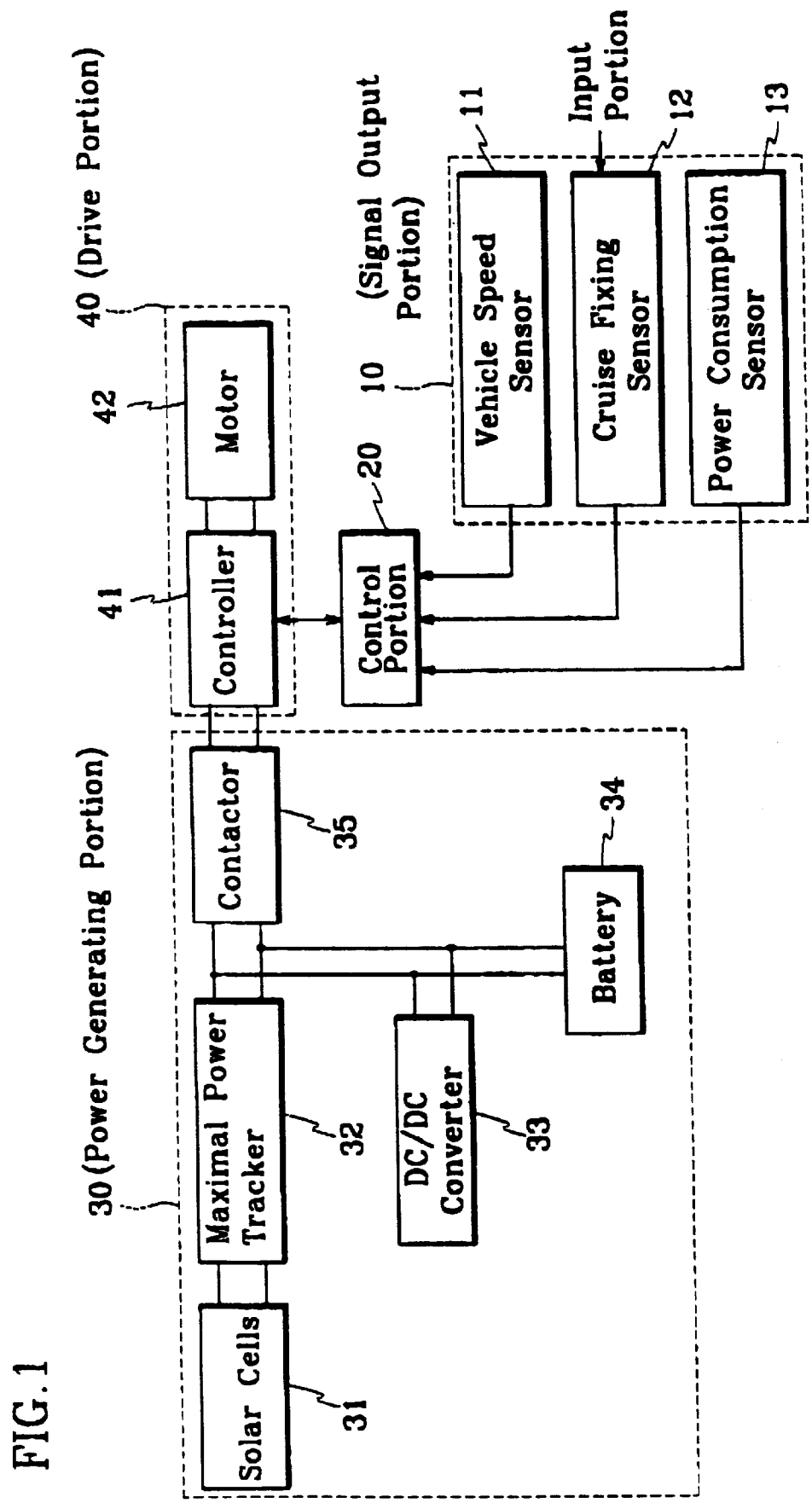
FIG. 1 is a block diagram of a compound cruise control system for solar cars according to a preferred embodiment of the present invention.

Referring to FIG. 1, the invention compound cruise control system for solar cars comprises a signal output portion 10 for generating signals relating to a driving condition of a vehicle, a control portion 20 for controlling the general operation of a vehicle by comparing the signals with pre-set information, a power generating portion 30 for generating drive electric energy, and a drive portion 40 for processing drive energy of the power generating portion 30 and making adjustments of vehicle operation according to signals from the control portion 20.

The signal output portion 10 includes a vehicle speed sensor 11 which detects key information such as vehicle speed and energy consumption for setting cruise control, and inputs the detected information signals to the control portion 20; a cruise fixing sensor 12 which detects key information input to set and release cruise control, and outputs a corresponding electric signal; and a power consumption sensor 13 which detects the amount of power being consumed and output a corresponding electric signal.

The control portion 20 has a memory storing a map table with regard to motor efficiency and a map table set after taking into account a high efficiency section of the motor on a vehicle drive resistance line, drive resistance enabling driving in a cruise speed, upper and lower drive speed limits, and a power consumption limit. The control portion 20 determines whether the vehicle is in a cruise drive motor after receiving signals from the signal output portion 10. When the cruise drive mode is determined, the control portion 20 establishes a cruise range of both vehicle speed and energy consumption on the basis of map data set according to changes in drive resistance, and outputs drive control signals corresponding to the cruise range.

The power generating portion 30 includes solar cells 31 which convert light energy into electric energy and either output this as drive power or first store the converted energy and output the same as drive power; a maximal power tracker 32 which controls a convergence degree of the solar cells 31 such that electric energy from the solar cells can be optimized; a DC/DC converter 33 which converts voltage of the electric energy received from the solar cells 31 and outputs the converted voltage; a battery 34 which stores and outputs electric energy from the DC/DC converter 33; and a contactor 35 which selects and outputs power output from the maximal power generating portion 32 and the battery 34.

The drive portion 40 includes a controller 41 which maintains a driving stage of the vehicle according to power input from the power generating portion 30 and control signals input from the control portion 20, processes the power supplied from the power generating portion 30 according to the signals from the control portion 20 and outputs the power as drive power, and adjusts a drive speed according to signals from the control portion 20; and a motor 42 which rotates wheels of the vehicle according to the signals output from the controller 41.

Figure 2:
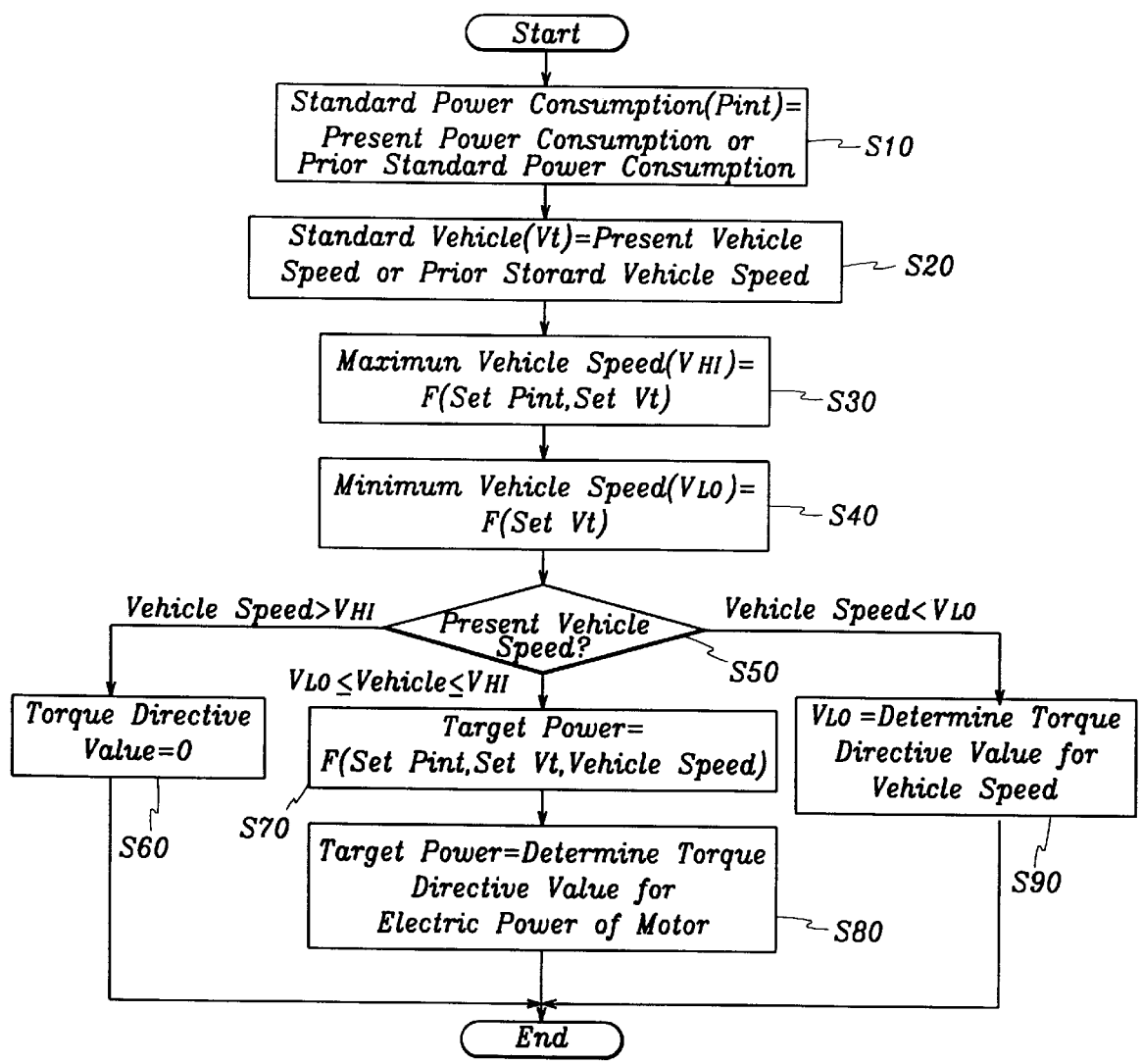
FIG. 2 is a flow chart of a compound cruise control method for solar care according to a preferred embodiment of the present invention.

The compound cruise control method of the compound cruise control system for solar cars structured as in the above will now be explained with reference to FIG. 2.

To make efficient use of the limited energy, if the driver selects cruise control in a state of 0% drive resistance (flat road surface, no wind, etc.) where the motor 42 is maintained at maximal optimal operating efficiency and using energy from the power generating portion 30, the control portion 20 puts the vehicle in a cruise mode according to signals from the cruise fixing sensor 12 of the signal output portion 10, detects signals from the power consumption sensor 13, and sets a standard power consumption level (Pint) for cruise control using the present power consumption level of the motor 42 or a standard consumption level established immediately prior to operation of the cruise control (S10).

Further, the control portion 20 detects signals from the vehicle speed sensor 11 then sets a standard vehicle speed (Vt) for cruise control using the present vehicle speed or the standard vehicle speed established immediately prior to operation of the cruise control (S20).

Next, the control portion 20 establishes a maximum vehicle speed ($V_{HI}$) (S30) and a minimum vehicle speed ($V_{LO}$) (S40), based on motor efficiency map data derived from the standard power consumption (Pint) and the standard vehicle speed (Vt) to begin the cruise mode.

In a state where cruise control is performed within a section of the established standard power consumption (Pint), standard vehicle speed (Vt), maximum vehicle speed ($V_{HI}$), and minimum vehicle speed ($V_{LO}$), the control portion 20 detects present vehicle speed input from the vehicle speed sensor 11 of the signal output portion 10 (S50).

If the present vehicle speed detected by the control portion 20 when cruise control is selected is above the maximum vehicle speed ($V_{HI}$), an overrun state, in which there is a reduction in drive resistance, is detected and an output torque value becomes "0" (S60).

In the above, if the detected present vehicle speed is less than the maximum vehicle speed ($V_{HI}$) and more than the minimum vehicle speed ($V_{LO}$), a target power from the standard power consumption (Pint), standard vehicle speed (Vt), and present vehicle speed is calculated using the following formula.

$$\text{Target Power } (Pout) = Pint \times \left(\frac{Vt}{Vo}\right)^3 \qquad \text{[Formula 1]}$$

Where, Pint is the standard power consumption when cruise control is set, Vt is the standard vehicle speed when cruise control is set, and Vo is the present vehicle speed.

After the calculation of the target power as in the above, the control portion 20 determines the output torque value based on the map data than controls the controller 41 to perform electric power cruise control for maintaining a power consumption target power level of the motor 42 (S80).

If it is detected in step (S50) that vehicle speed is less than the minimum vehicle speed ($V_{LO}$), drive resistance is increased and it is detected that vehicle speed is reduced and an output torque value is calculated using the above Formula 1 (S90).

Next, the control portion 20 controls the controller 41 of the drive portion 40 according to the calculated directive value to perform vehicle speed cruise control.

When cruise control is performed at a set level of power consumption, vehicle speed, and drive conditions, if vehicle speed changes due to alterations in drive resistance, dual control is performed on power consumption and vehicle speed based on the map data such that the motor runs at optimal efficiency. Accordingly, energy is efficiently used and power loss of the engine is minimized.

Figure 3:
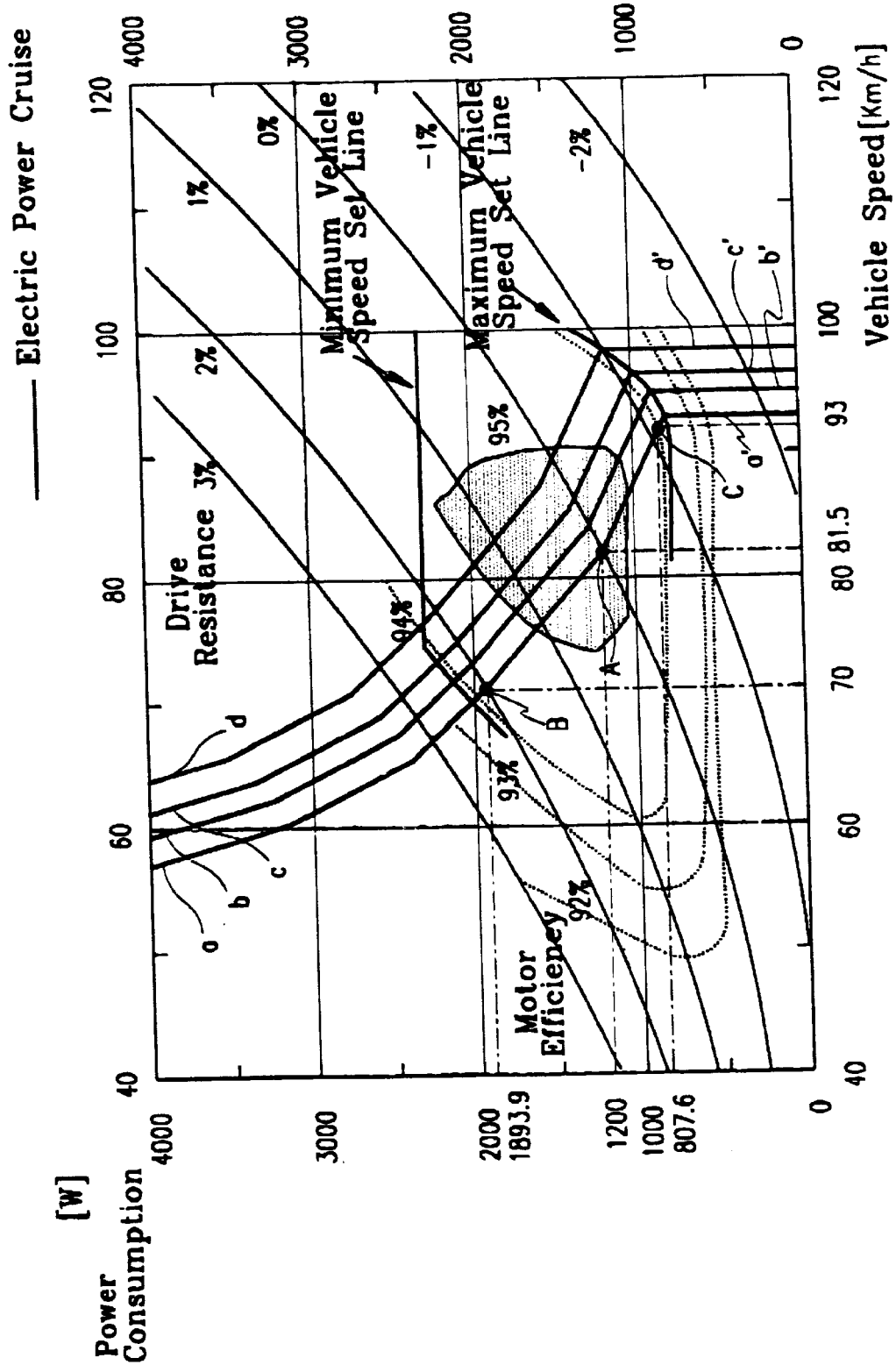
FIG. 3 is a graph illustrating a cruise control pattern according to a preferred embodiment of the present invention.

This will be explained in more detail with reference to FIG. 3 illustrating a cruise control pattern according to a preferred embodiment of the present invention.

As shown in the drawing, if cruise control is selected with the vehicle driving at point A (a state of 95% motor efficiency, vehicle speed of 81.5 kph to be between the minimum and maximum vehicle speeds, power consumption at 1200W, and 0% drive resistance), if drive resistance increases to 2%, the vehicle changes to point B such that vehicle speed is reduced to 70 kph. The control portion 20 detects this change in speed and calculates the target power (Pout) using the above Formula 1.

Using the formula, the target power (Pout) is calculated at 1893.9W. Accordingly, the control portion 20 outputs a control signal to the controller 41 such that 1893.9W is consumed to maintain the vehicle at point "B".

In another example, if cruise control is selected with the vehicle driving at point A, if drive resistance decreases by 1%, the vehicle changes to point C such that vehicle speed is increased to 93 kph. The control portion 20 detects this change in speed and calculates the target power (Pout) using Formula 1.

Using the formula, the target power (Pout) is calculated at 807.6W. Accordingly, the control portion 20 outputs a control signal to the controller 41 such that 807.6W is consumed to maintain the vehicle at point "C".

As explained above, if there is a change in drive resistance while driving using the cruise control, the resulting change in speed is detected and the target power is calculated according to the pre-set map data illustrated as lines a—a', b—b', c—c' and d—d' in FIG. 3. Accordingly, electric power and vehicle speed are dually controlled for effective cruise control.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A compound cruise control system for solar cars, comprising:

a signal output portion for detecting and generating signals regarding vehicle speed, power consumption, and cruise control selection of an operating vehicle;

a control portion for controlling the general operation of the vehicle according to the generated signals and established map data;

a power generating portion for generating drive electric energy; and a drive portion for processing drive energy of the power generating portion and making adjustments of vehicle operation according to signals from the control portion.

2. The compound cruise control system of claim 1, wherein the signal output means comprises:

a vehicle speed sensor which detects key information for setting cruise control, vehicle speed information, and energy consumption information and inputs the detected signals to the control portion, and detects present vehicle speed and outputs a corresponding electric signal;

a cruise fixing sensor which detects key information input to set and release cruise control, and outputs a corresponding electric signal; and a power consumption sensor which detects the amount of power being consumed and outputs a corresponding electric signal.

3. The compound cruise control system of claim 1, wherein the power generating portion comprises:

solar cells which convert light energy into electric energy, merge the electric energy from each cell and output the same;

a maximal power tracker which controls a convergence degree of the solar cells such that electric energy from the same can be optimized;

a DC/DC converter which converts voltage of the electric energy received from the solar cells and outputs the converted voltage;

a battery which stores and outputs electric energy from the DC/DC converter; and a contactor which selects and outputs power output from the maximal power generating portion and the battery.

4. The compound cruise control system of claim 1, wherein the drive portion comprises:

a controller which processes the power supplied from the power generating portion to a predetermined state according to the signals from the control means and outputs drive power; and a motor which rotates wheels of the vehicle according to the signals output from the controller.

5. The compound cruise control system of claim 1, wherein the control portion establishes a map table after taking into account a map table with regard to motor efficiency in a memory section, a high efficiency section of the motor on a vehicle drive resistance line, drive resistance enabling driving in a cruise speed, upper and lower drive speed limits, and a power consumption limit.

6. A compound cruise signal method for solar cars comprising the steps of:

setting a standard power consumption level using a present power consumption level of the motor or a standard consumption level established immediately prior to operation of cruise control, and setting a standard vehicle speed using the present vehicle speed or the standard vehicle speed established immediately prior to operation of the cruise control;

setting a maximum vehicle speed and a minimum vehicle speed based on motor efficiency map data derived from the standard power consumption and the standard vehicle speed;

determining present vehicle speed and comparing the same with said maximum and minimum vehicle speeds;

calculating target power according to said standard power, standard vehicle speed, and present vehicle speed when the present vehicle speed is between said maximum and minimum vehicle speeds; and determining an output torque value such that target power becomes drive power consumption of the motor, and maintaining cruise control at a vehicle speed within a section of motor efficiency.

7. The compound cruise control method of claim 6, wherein the output torque value is set at '0' if it is determined that the vehicle is in an overrun state, caused by a reduction in drive resistance, where the present vehicle speed is above the maximum vehicle speed.

8. The compound cruise control method of claim 6, wherein if it is detected that vehicle speed is less than the minimum vehicle speed, the output torque value is calculated and cruise control is maintained after the target power is calculated.

9. The compound cruise control method of claim 6, wherein the target power, set according to changes in drive resistance when driving in cruise control, is calculated using the following formula:

$$\text{Target Power } (Pout) = Pint \times \left(\frac{Vt}{Vo}\right)^3$$

10. The compound cruise control method of claim 9, wherein if the target power, calculated according to changes in drive resistance, is below the standard power consumption, vehicle speed is increased, and if the target power is above the standard power consumption, vehicle speed is reduced.

11. The compound cruise control method of claim 6, wherein if the target power, calculated according to changes in drive resistance, is below the standard power consumption, vehicle speed is increased, and if the target power is above the standard power consumption, vehicle speed is reduced.

12. A compound cruise control method, comprising:

setting a standard motor power and a standard vehicle speed;

setting a maximum vehicle speed and a minimum vehicle speed for a cruise control;

comparing a present vehicle speed with the maximum vehicle speed and the minimum vehicle speed;

determining and setting a motor torque to maintain the present vehicle speed between the minimum and maximum vehicle speeds based on the standard power, standard vehicle speed, and result of said comparing step, wherein the step of determining and setting includes:

calculating a target motor power based on the standard power, standard vehicle speed, and present vehicle speed if the present vehicle speed is less than or equal to the maximum vehicle speed; and setting the motor torque so that the motor consumes the target motor power.

13. The method of claim 12, wherein the step of calculating calculates the target motor power according to the following formula:

target motor power=(standard motor power)*(standard vehicle speed/present vehicle speed)³.

14. The method of claim 13, wherein the present vehicle speed in the formula is set to the minimum vehicle speed, if the present vehicle speed is less than the minimum vehicle speed.

* * * * *